United States Patent
Kim et al.

(12) 
(10) Patent No.: US 9,960,796 B2
(45) Date of Patent: May 1, 2018

(54) METHOD FOR ENHANCING PERFORMANCE OF MULTI-INPUT MULTI-OUTPUT SYSTEM ON LINE-OF-SIGHT

(71) Applicant: ELECTRONICS AND TELECOMMUNICATIONS RESEARCH INSTITUTE, Daejeon (KR)

(72) Inventors: Bong Su Kim, Daejeon (KR); Min Soo Kang, Daejeon (KR); Kwang Seon Kim, Sejong (KR); Woo Jin Byun, Daejeon (KR); Myung Sun Song, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 15/188,045

(22) Filed: Jun. 21, 2016

(65) Prior Publication Data
US 2017/0194992 A1 Jul. 6, 2017

(30) Foreign Application Priority Data
Jan. 4, 2016 (KR) .......... 10-2016-0000527

(51) Int. Cl.
*H04B 1/707* (2011.01)
*H04B 1/10* (2006.01)
(Continued)

(52) U.S. Cl.
CPC ............ *H04B 1/10* (2013.01); *H04B 1/18* (2013.01); *H04B 7/0452* (2013.01); *H04B 7/08* (2013.01)

(58) Field of Classification Search
CPC .... H04B 1/7107; H04B 1/10; H04B 10/2507; H04B 17/336; H04B 1/1027; H04B 1/109;
(Continued)

(56) References Cited

U.S. PATENT DOCUMENTS

| | | | |
|---|---|---|---|
| 6,996,197 B2* | 2/2006 | Thomas | H04B 1/10 375/346 |
| 2001/0016478 A1 | 8/2001 | Lindenmeier et al. | |

(Continued)

FOREIGN PATENT DOCUMENTS

| | | |
|---|---|---|
| KR | 10-0418284 | 2/2004 |
| KR | 10-0785996 | 12/2007 |

*Primary Examiner* — Sai Aung
(74) *Attorney, Agent, or Firm* — Kile Park Reed & Houtteman PLLC

(57) ABSTRACT

Provided are a multi-input multi-output system which overcomes a disadvantage that optimal receiving performance cannot be maintained according to an installation environment and a performance change of a receiver when a receiving module is configured by using a fixed attenuator and a fixed phase in a line-of-sight multi-input multi-output system configuration and analogously controls an interference removing module of a receiver including a variable attenuator and a phase shifter which are controllable to enhance a receiving performance and increase frequency efficiency, in order to maximize a signal-to-interference ratio of each path and an operating method thereof.

19 Claims, 13 Drawing Sheets

(51) Int. Cl.
*H04B 1/18* (2006.01)
*H04B 7/0452* (2017.01)
*H04B 7/08* (2006.01)

(58) Field of Classification Search
CPC ..... H04B 1/7103; H04L 43/16; H04L 5/1461; H04L 27/02; H04L 1/0618; H04L 5/1423
See application file for complete search history.

(56) References Cited

U.S. PATENT DOCUMENTS

| | | | |
|---|---|---|---|
| 2002/0072336 A1* | 6/2002 | Mottier | H04B 1/7103 455/101 |
| 2004/0028121 A1* | 2/2004 | Fitton | H04B 1/7107 375/144 |
| 2007/0058761 A1 | 3/2007 | Lindenmeier | |
| 2009/0088116 A1 | 4/2009 | Nam et al. | |
| 2013/0308732 A1* | 11/2013 | Kpodzo | H04B 1/1027 375/346 |
| 2013/0309976 A1 | 11/2013 | Koren et al. | |
| 2014/0376464 A1 | 12/2014 | Nam et al. | |

\* cited by examiner

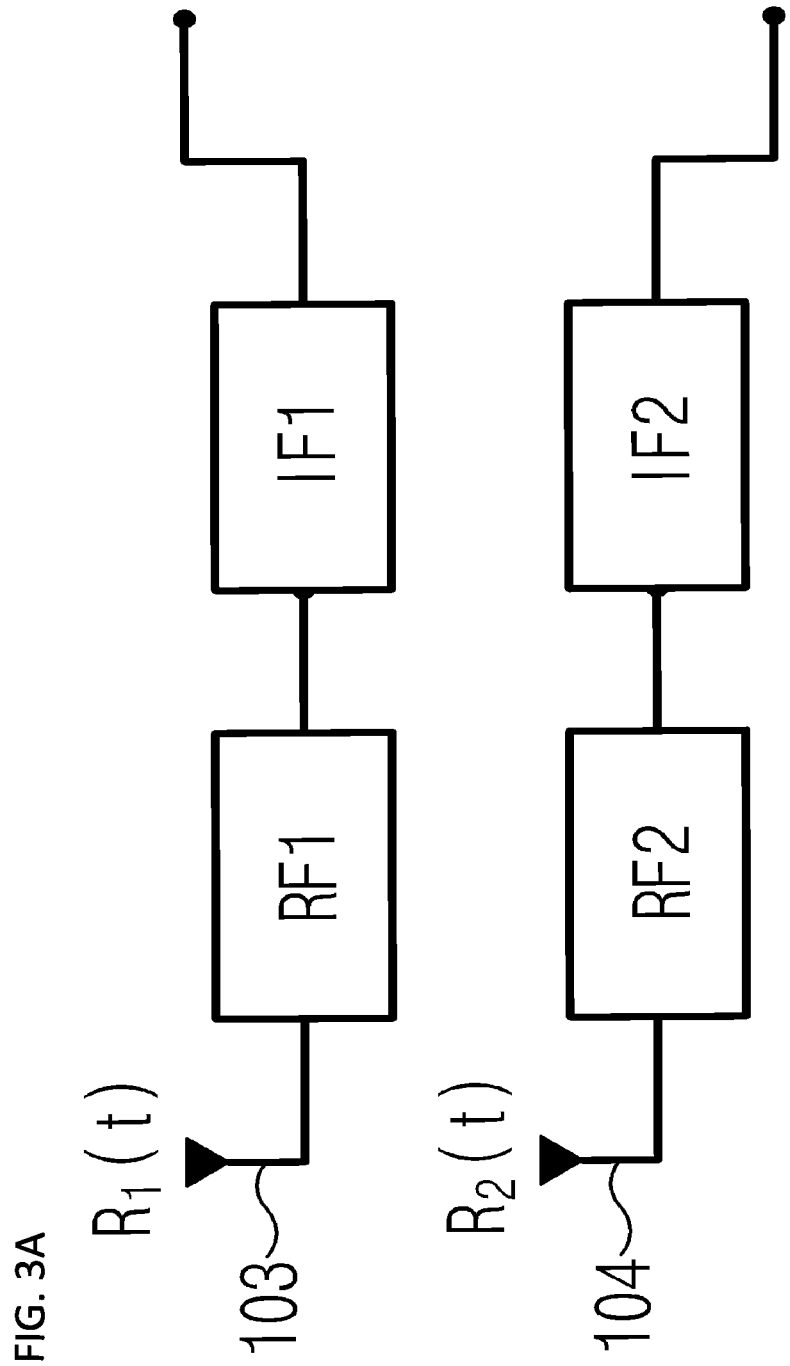

METHOD FOR ENHANCING PERFORMANCE OF MULTI-INPUT MULTI-OUTPUT SYSTEM ON LINE-OF-SIGHT

CROSS-REFERENCE TO RELATED APPLICATIONS

This application claims priority to and the benefit of Korean Patent Application No. 10-2016-0000527 filed in the Korean Intellectual Property Office on Jan. 4, 2016, the entire contents of which are incorporated herein by reference.

TECHNICAL FIELD

The present invention relates to a multi-input multi-output system and an operating method thereof, and particularly, a multi-input multi-output system for enhancing a receiving performance of the multi-input multi-output system using a plurality of transmitting antennas and a plurality of receiving antennas in an environment in which a line-of-sight is strong and increasing frequency efficiency and an operating method thereof.

BACKGROUND ART

In mobile communication, various frequency efficiency enhancing technologies have been used in order to support more users and achieve a higher transmission rate. One among them is a multi-input multi-output technology that increases a channel capacity by using multiple transmitters and receivers. It is known that the multi-input multi-output technology shows an excellent performance in a rich scattering environment, but the performance of the multi-input multi-output technology deteriorates under a line-of-sight environment. However, a wider bandwidth has been required according to a demand for high-speed communication, and as a result, there is a trend that a transmitting frequency increases up to a millimeter wave band. Due to a characteristic of the millimeter wave, since the millimeter wave is primarily used in a line-of-sight environment having strong linearity, it is not easy to apply the multi-input multi-output technology thereto. However, by recent researches, when transmitting and receiving antennas are appropriately separated from each other, it is demonstrated that orthogonality can be maintained among channels and various performance verification using the demonstration is made.

FIG. 1 is a diagram for describing a general line-of-sight 2×2 multi-input multi-output system.

As illustrated in FIG. 1, when the 2×2 system is assumed, a distance Da/Db between one-side antenna and one-side antenna is proportional to a link distance R and a wavelength λ. An example of the distance Da/Db between one-side antenna and one-side antenna in which a signal phase difference between the antennas becomes 90° according to the link distance R at 18.7 GHz is shown in [Table 1]. For example, in the link distance R of 1 Km, as the distance Da/Db between one-side antenna and one-side antenna, 2.828 m is required.

TABLE 1

Distance between one-side antenna and one-side antenna required according to link distance

| Distance | 90° |
|---|---|
| 5 m | 20 cm |
| 31.25 m | 50 cm |
| 125 m | 1 m |
| 500 m | 2 m |
| 1000 m | 2.828 m |

In general, it can be seen that an 18.7-GHz fixed wireless communication system may have a lot of problems in actual installation on reality in which a link distance of several kms is required. In addition, when a radio link is configured by using the same product, there is a problem in that a distance between the antennas according to the distance needs to be continuously controlled.

SUMMARY OF THE INVENTION

The present invention has been made in an effort to provide a multi-input multi-output system which can overcome a disadvantage that optimal receiving performance cannot be maintained according to an installation environment and a performance change of a receiver when a receiving module is configured by using a fixed attenuator and a fixed phase in a line-of-sight multi-input multi-output system configuration and analogously controls an interference removing module including a receiver including a variable attenuator and a phase shifter which are controllable and an interference removing module to enhance a receiving performance and increase frequency efficiency, in order to maximize a signal-to-interference ratio of each path and an operating method thereof.

The technical objects of the present invention are not limited to the aforementioned technical objects, and other technical objects, which are not mentioned above, will be apparently appreciated to a person having ordinary skill in the art from the following description.

An exemplary embodiment of the present invention provides an interference removing module of a receiver in a multi-input multi-output system for point-to-point communication between a transmitter and a receiver on a line-of-sight, including: an attenuator on a direct path for processing a first received signal of the first received signal and a second received signal received through two receiving antennas; a phase shifter on a cross path for processing the second received signal of the first received signal and the second received signal received through the two receiving antennas; a coupler generating a reconstruction signal for a transmission signal transmitted from the transmitter by synthesizing an output of the attenuator and an output of the phase shifter; and a controller performing overall control, wherein according to control of the controller, interference signals on the direct path and the cross path are removed to generate the reconstruction signal removed with the interference signal in the coupler.

The interference removing module may be implemented by an analog circuit to remove the interference signal through an analog method.

The interference removing module is implemented by an analog circuit to remove the interference signal through an analog method.

The interference removing module may be coupled between a radio frequency (RF) unit and an intermediate frequency (IF) unit or between the two receiving antennas and the RF unit.

The phase shifter may control a phase of the second received signal on the cross path according to a control of a controller and the attenuator as a fixed attenuator may compensate for an insertion loss of the phase shifter on the direct path.

Alternatively, the phase shifter may control the phase of the second received signal on the cross path according to the control of the controller, and the attenuator as a variable attenuator may control attenuation of a magnitude of the first received signal and compensate for the insertion loss of the phase shifter on the direct path according to the control of the controller.

The interference removing module may further include a second variable attenuator and a second phase shifter in addition to the attenuator as a first variable attenuator and the phase shifter as a first phase shifter, wherein the interference removing module may include a structure having the first variable attenuator and the first phase shifter sequentially coupled on the direct path in order to process the first received signal output from the first distributor between a first distributor connected to a first antenna between the two receiving antennas and the coupler, and the second variable attenuator and the second phase shifter sequentially coupled on the cross path in order to process the second received signal output from the second distributor between a second distributor connected to a second antenna between the two receiving antennas and the coupler.

The interference removing module may further include a second variable attenuator and a second phase shifter in addition to the attenuator as the first variable attenuator and the phase shifter as the first phase shifter, wherein the interference removing module includes a structure having the first variable attenuator connected to the first antenna between the two receiving antennas and the first phase shifter on the direct path, which processes the first received signal output from the first distributor between the first distributor connected to an output of the first variable attenuator and the coupler, and the second variable attenuator connected to the second antenna between the two receiving antennas and the second phase shifter on the cross path, which processes the second received signal output from the second distributor between the second distributor connected to an output of the second variable attenuator and the coupler.

The controller may control the phase shift by a small unit with respect to the phase shifter when an output of the coupler is minimum power by controlling the phase shift by a large unit with respect to the phase shifter to control the reconstruction signal when the interference signal is smaller than a threshold value to be generated.

The controller may control a signal magnitude change by the small unit with respect to the attenuator when the output of the coupler is the minimum power by controlling the signal magnitude change by the large unit with respect to the attenuator as the variable attenuator to control the reconstruction signal when the interference signal is smaller than the threshold value to be generated.

The interference removing module may further include: a second attenuator on a second direct path for processing the second received signal; a second phase shifter on a second cross path for processing the first received signal; a second coupler generating a second reconstruction signal for the second transmitted signal transmitted by the transmitter by synthesizing an output of the second attenuator and an output of the second phase shifter; and an interference removing unit further performing digital type interference removal with respect to the reconstruction signal and the second reconstruction signal, wherein the interference removing unit may extract and remove the interference signal of the transmitted signal transmitted by the transmitter from the second reconstruction signal by using the reconstruction signal and extract and remove the interference signal of the second transmitted signal transmitted by the transmitter from the reconstruction signal by using the second reconstruction signal to output signals in which a signal-to-interference ratio (SIR) is enhanced.

Another exemplary embodiment of the present invention provides an interference removing method of a receiver in a multi-input multi-output system for point-to-point communication between a transmitter and a receiver on a line-of-sight, including: processing, by an attenuator on a direct path, a first received signal of the first received signal and a second received signal received through two receiving antennas; processing, by a phase shifter on a cross path, the second received signal of the first received signal and the second received signal received through the two receiving antennas; and generating, by a coupler, a reconstruction signal for a transmission signal transmitted from the transmitter by synthesizing an output of the attenuator and an output of the phase shifter, wherein in the interference removing method, interference signals on the direct path and the cross path are removed to generate the reconstruction signal removed with the interference signal through the coupler.

The interference removing method may be performed between a radio frequency (RF) unit and an intermediate frequency (IF) unit or between the two receiving antennas and the RF unit.

The phase shifter may control a phase of the second received signal on the cross path according to a control of a controller and the attenuator as a fixed attenuator may compensate an insertion loss of the phase shifter on the direct path.

Alternatively, the phase shifter may control the phase of the second received signal on the cross path according to the control of the controller and the attenuator as a variable attenuator may control attenuation of a magnitude of the first received signal on the direct path according to the control of the controller and compensate the insertion loss of the phase shifter.

The interference removing method may further include: wherein a second variable attenuator and a second phase shifter are further used in addition to the attenuator as the first variable attenuator and the phase shifter as the first phase shifter, processing the first received signal output from the first distributor between a first distributor connected to a first antenna of the two receiving antennas and the coupler by using the first variable attenuator and the first phase shifter sequentially coupled on the direct path; and processing the second received signal output from the second distributor between a second distributor connected to a second antenna of the two received antennas and the coupler by using the second variable attenuator and the second phase shifter sequentially coupled on the cross path.

The interference removing method may further include: wherein the second variable attenuator and the second phase shifter are further used in addition to the attenuator as the first variable attenuator and the phase shifter as the first phase shifter, processing the first received signal output from the first distributor between the first distributor connected to an output of the first variable attenuator connected to the first antenna of the two received antennas and the coupler by using the first phase shifter on the direct path; and processing the second received signal output from the second distributor between the second distributor connected to an output of the second variable attenuator connected to the second antenna of the two received antennas and the coupler by using the second phase shifter on the cross path.

The controller may control the phase shift by a small unit with respect to the phase shifter when an output of the coupler is minimum power by controlling the phase shift by a large unit with respect to the phase shifter to control the reconstruction signal when the interference signal is smaller than a threshold value to be generated.

The controller may control a signal magnitude change by the small unit with respect to the attenuator when the output of the coupler is the minimum power by controlling the signal magnitude change by the large unit with respect to the attenuator as the variable attenuator to control the reconstruction signal when the interference signal is smaller than the threshold value to be generated.

The interference removing method may further include: wherein a second attenuator on a second direct path for processing the second received signal, a second phase shifter on a second cross path for processing the first received signal, a second coupler generating a second reconstruction signal for the second transmitted signal transmitted by the transmitter by synthesizing an output of the second attenuator and an output of the second phase shifter, and an interference removing unit further performing digital type interference removal with respect to the reconstruction signal and the second reconstruction signal are further used, extracting and removing, by the interference removing unit, the interference signal of the transmitted signal transmitted by the transmitter from the second reconstruction signal by using the reconstruction signal and extracting and removing the interference signal of the second transmitted signal transmitted by the transmitter from the reconstruction signal by using the second reconstruction signal to output signals in which a signal-to-interference ratio (SIR) is enhanced.

According to exemplary embodiment of the present invention, in a multi-input multi-output system and an operating method thereof, provided is a multi-input multi-output system which analogously and automatically controls a variable attenuator and a phase shifter of an interference removing module of a receiver to maximize a signal-to-interference ratio of each path and maintain a optimal receiving performance and increase frequency efficiency according to an installation environment and a change in performance of the receiver, thereby continuously maintaining optimal performance. Further, a further enhanced performance can be provided by using both an analog interference removing method and a digital interference removing method.

In addition, since an interference removing module proposed in the present invention is inserted into a part of the receiver to simply operate in the conventional single-link transmission system, compatibility with the conventional system can be increased.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 3A is an exemplary diagram of a conventional multi-input multi-output system without an interference removing module.

Figure 1:
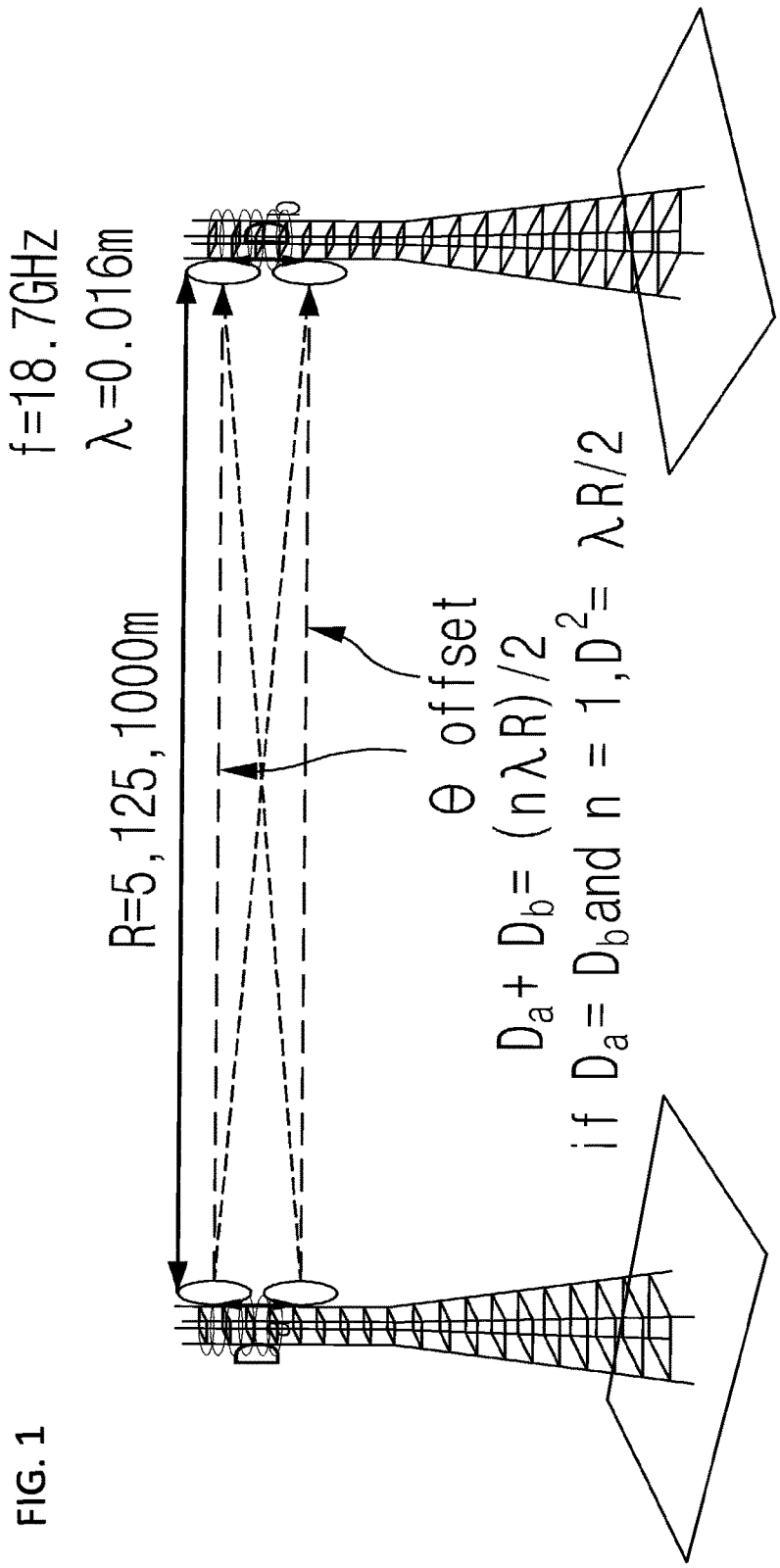
FIG. 1 is a diagram for describing a general line-of-sight 2×2 multi-input multi-output system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal meaning or excessively formal meanings unless clearly defined in the present application.

Figure 2:
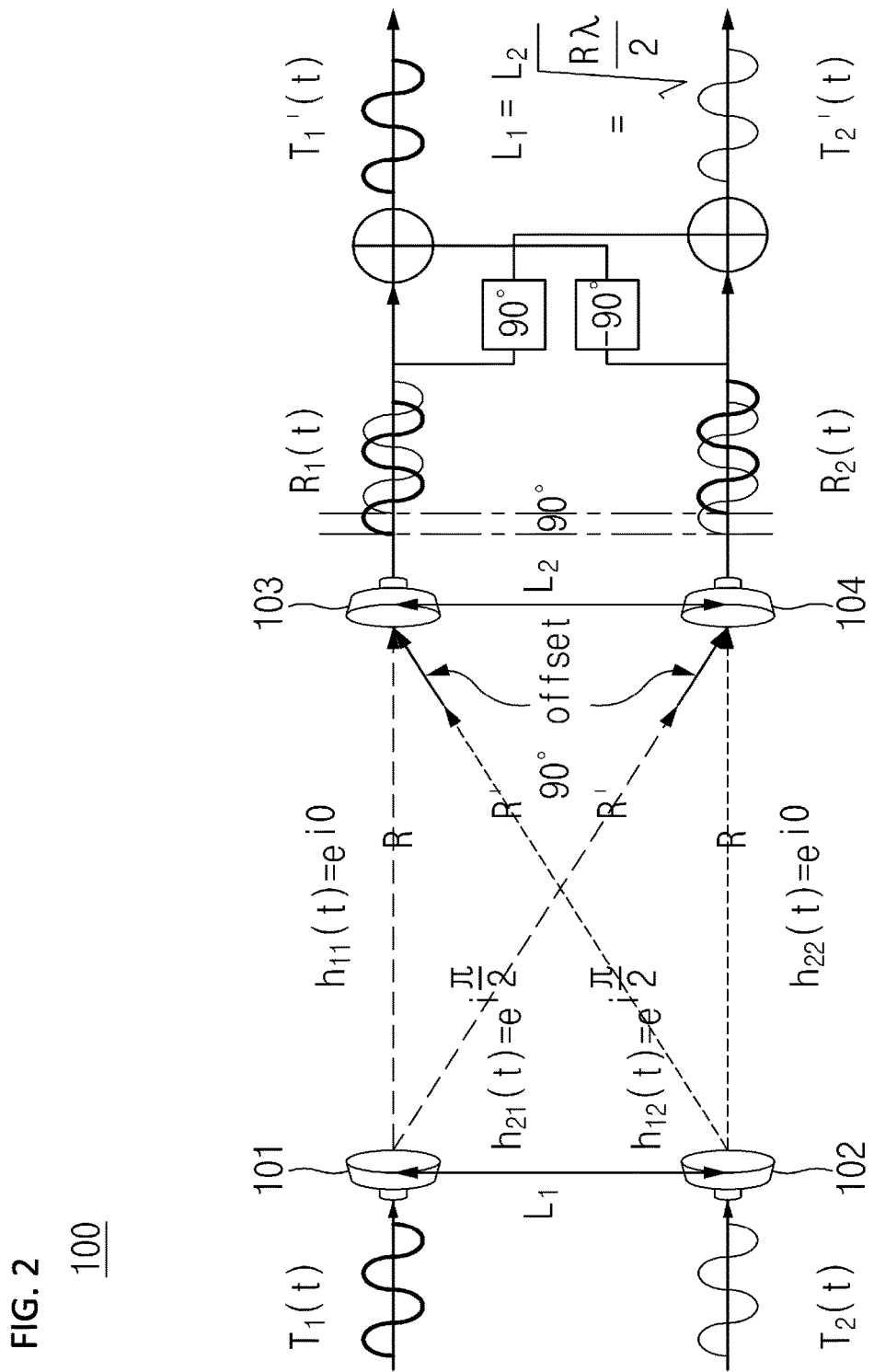
FIG. 2 is a diagram for describing a basic configuration of a line-of-sight multi-input multi-output system according to an exemplary embodiment of the present invention.

FIG. 2 is a diagram for describing a basic configuration of a line-of-sight multi-input multi-output system according to an exemplary embodiment of the present invention. Herein, a 2×2 multi-input multi-output system 100 including a transmitter and two transmitting antennas 101 and 102 coupled thereto and two receiving antennas 103 and 104 and a receiver coupled thereto will be exemplarily described.

Referring to FIG. 2, the transmitter radiates two transmission signals $T_1(t)$ and $T_2(t)$ through the transmitting antennas 101 and 102. Under a line-of-sight environment, the receiver processes signals received through two receiving antennas 103 and 104 to generate reconstruction signals $T_1'(t)$ and $T_2'(t)$ for the transmission signals.

Herein, a distance R between transmitting antenna #1 101 and receiving antenna #1 103 and a distance R' between transmitting antenna #1 101 and receiving antenna #2 104 need to be configured to have a phase difference $e^{j0}$ and $e^{j\pi/2}$ of 90° at a center frequency of the transmission signals. The above situation is similarly applied even in transmitting antenna #2 102. In this case, according to the signal $T_1(t)$ transmitted through transmitting antenna #1 101, signals $R_1(t)$ and $R_2(t)$ received through two receiving antennas 103 and 104 have the phase difference of 90°. Therefore, the reconstruction signal $T_1'(t)$ generated by phase-shifting the signal of $R_2(t)$ to −90° and thereafter, summing up the phase-shifted signal with $R_1(t)$ theoretically becomes the transmissions signal $T_1(t)$. Such a situation is similarly applied even in $T_2(t)$.

However, in an actual situation, when a distance between the antennas is fixed, there is a problem that a performance varies depending on an installation distance and when the distance between the antennas is changeable, there are many difficulties in finding an accurate distance.

In order to solve the problems, as described below, in the present invention, a system may be designed to continuously have an optimal performance by controlling a phase of a received signal through a phase shifter of an interference removing module provided in the receiver.

FIG. 3A is an exemplary diagram of a conventional multi-input multi-output system without an interference removing module. As illustrated in FIG. 3A, in general, the receiver includes RF units RF1 and RF2 and IF units IF1 and IF2 for processing the signals $R_1(t)$ and $R_2(t)$ received through two receiving antennas 103 and 104. Two different frequency bands are processed by using two radio frequency (RF) units RF1 and RF2 and two intermediate frequency (IF) units IF1 and IF2, respectively, to acquire a double transmission capacity in communication between the transmitter and the receiver. The RF units RF1 and RF2 receive radio signals and the IF units IF1 and IF2 down-convert the received radio signals into predetermined intermediate frequencies.

Figure 3B:
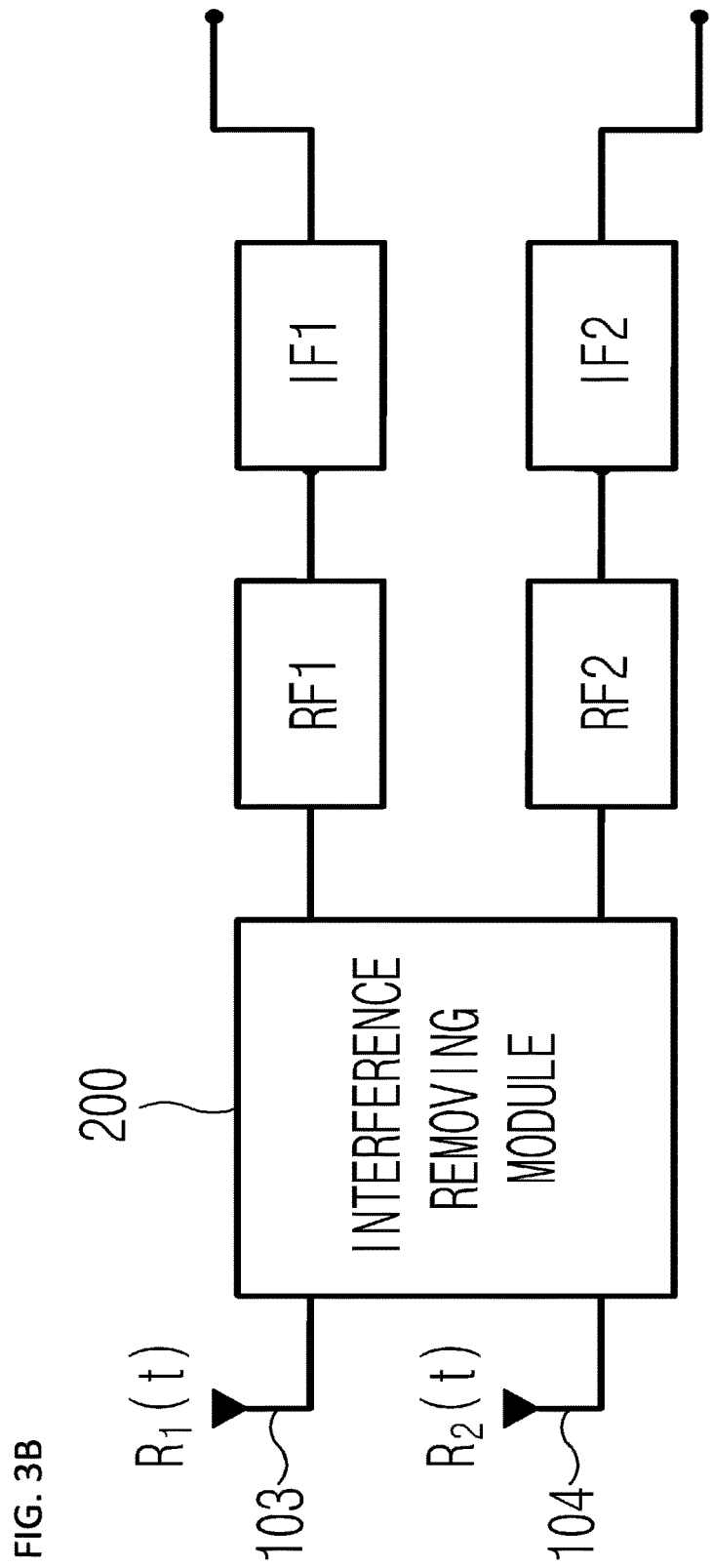
FIG. 3B illustrates one example of a use position of an interference removing module of the present invention.
Figure 3C:
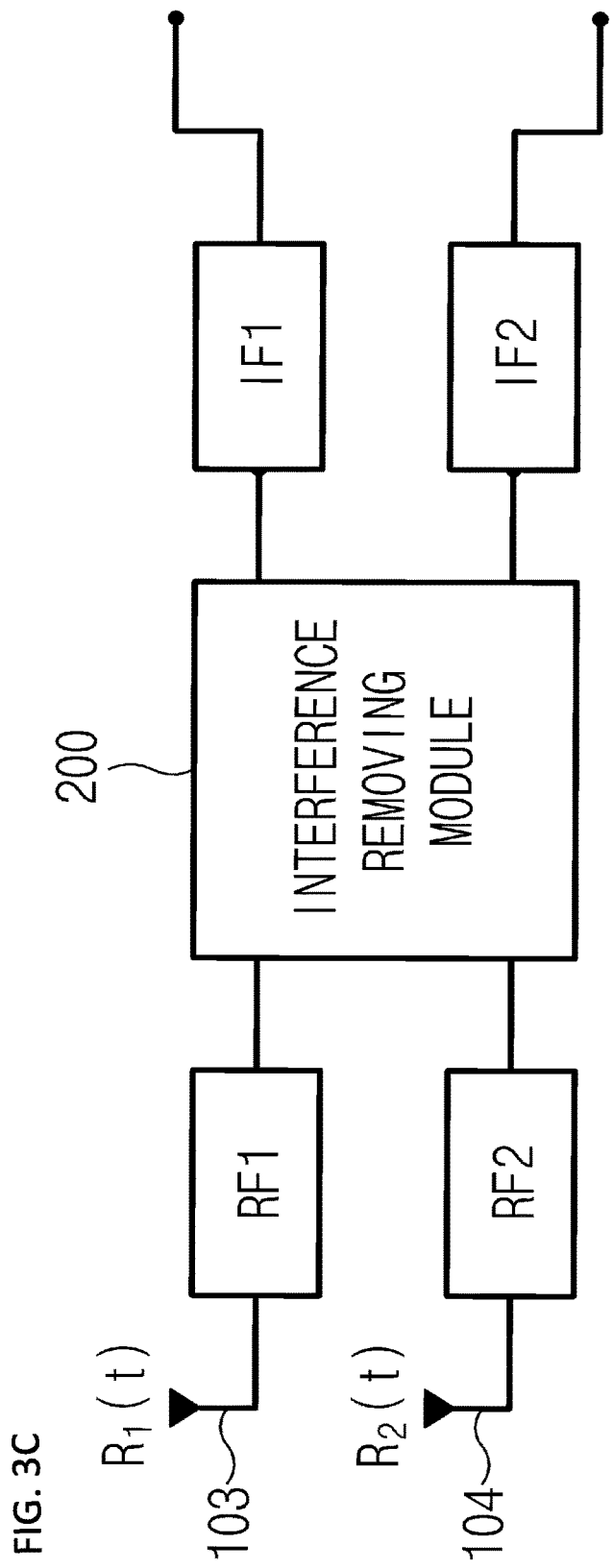
FIG. 3C illustrates another example of the use position of the interference removing module of the present invention.

FIG. 3B illustrates one example of a use position of an interference removing module 200 of the present invention. FIG. 3C illustrates another example of the use position of the interference removing module 200 of the present invention.

The interference removing module 200 provided in the receiver of the present invention may be coupled between two receiving antennas 103 and 104 and two RF units RF1 and RF2 in the 2×2 multi-input multi-output system 100 as illustrated in FIG. 3B or coupled between two RF units RF1 and RF2 and two IF units IF1 and IF2 in the 2×2 multi-input multi-output system 100 as illustrated in FIG. 3C.

The interference removing module 200 of the present invention may be designed in such a manner that inputs and outputs may be directly connected to a signal path of the receiver in the general multi-input multi-output system illustrated in FIG. 3A. That is, the interference removing module 200 is configured in such a manner that the interference removing module 200 is just inserted into the RF part or the IF part to connect front and rear inputs and outputs as illustrated in FIG. 3A/3B even in a single frequency band to perform the same function. Since the interference removing module 200 of the present invention is simply inserted into a part of the receiver to operate, compatibility with the convention system may be increased.

Figure 4:
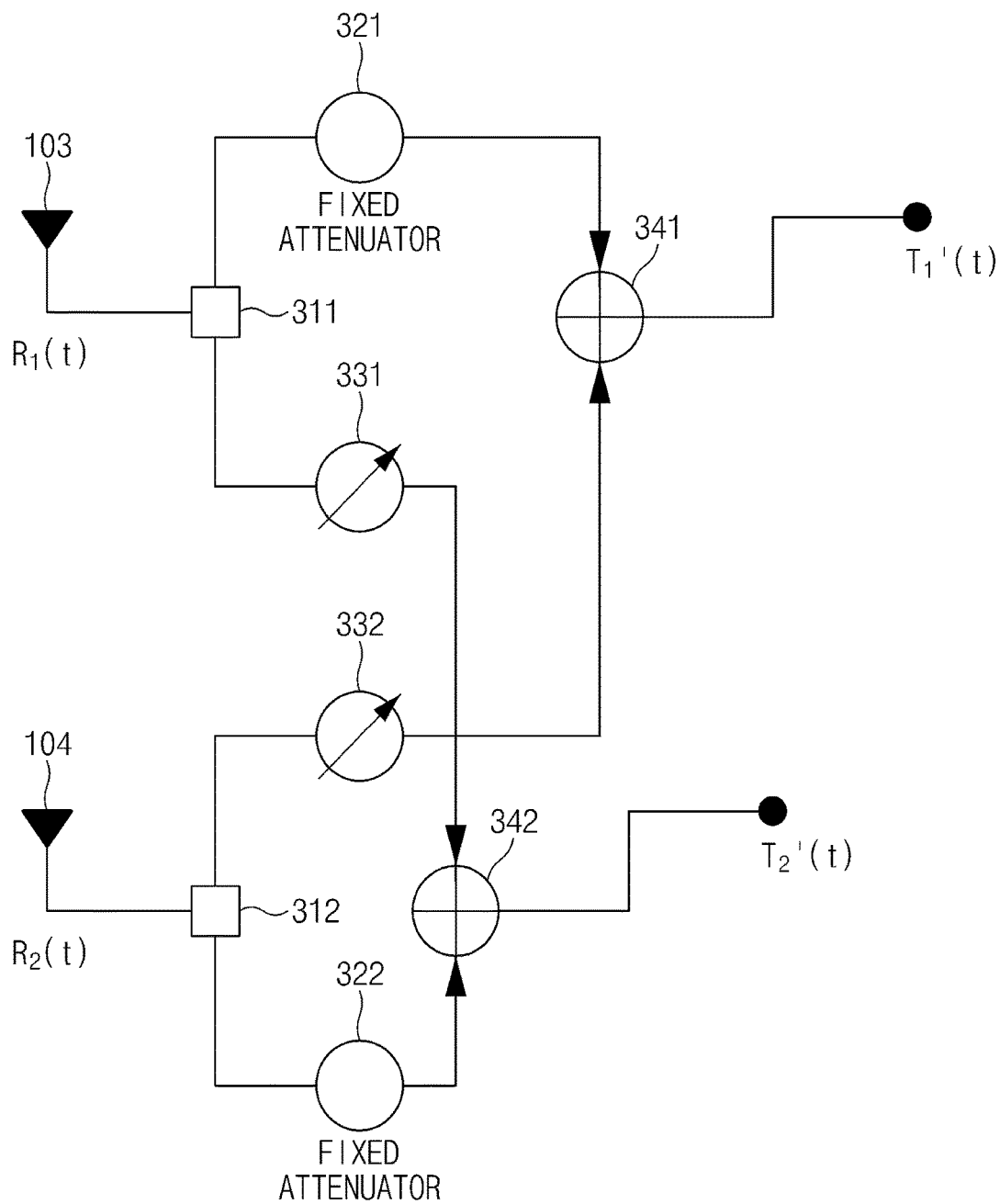
FIG. 4 is a configuration diagram of an interference removing module according to an exemplary embodiment of the present invention.

FIG. 4 is a configuration diagram of an interference removing module 300 according to an exemplary embodiment of the present invention. FIG. 4 is a diagram illustrating a configuration of a 2×2 line-of-sight multi-input multi-output interference removing module by using controllable phase shifters 331 and 332.

Referring to FIG. 4, the interference removing module 300 according to the exemplary embodiment of the present invention includes power distributors 311 and 312, fixed attenuators 321 and 32, phase shifters 331 and 332, and power couplers 341 and 342. Besides, the interference removing module 300 further includes a controller (not illustrated) for overall control of the components. The controller may be implemented by a semiconductor processor, and the like.

The respective power distributors 311 and 312 distribute and output the signals $R_1(t)$ and $R_2(t)$ received by the respective receiving antennas 103 and 104 to the respective fixed attenuators 321 and 322 and the phase shifters 331 and 332.

The fixed attenuators 321 and 322 appropriately attenuate magnitudes of respective input signals.

The power coupler 341 synthesizes (alternatively, sums up) an attenuation signal from the fixed attenuator 321 and a signal phase-shifted by −90° from the phase shifter 332 to output the reconstruction signal $T_1'(t)$. The power coupler 342 synthesizes (alternatively, sums up) an attenuation signal from the fixed attenuator 322 and a signal phase-shifted by −90° from the phase shifter 331 to output the reconstruction signal $T_2'(t)$.

In this case, when it is assumed that the magnitudes of the received signals $R_1(t)$ and $R_2(t)$ are the same as each other, in generating the reconstruction signal $T_1'(t)$, the fixed attenuator 321 on a direct path signal-attenuates an insertion loss generated by the phase shifter 332 on a cross path to compensate the insertion loss and the phase shifter 332 shifts and outputs a phase of the input signal and a controller (not illustrated) appropriately controls a phase shift (e.g., a phase shift of 360°) of the phase shifter 332 to minimize interference between both signals. Such a situation is similarly applied even in generating the reconstruction signal $T_2'(t)$.

A structure of FIG. 4 has no problem when the insertion loss is not changed while the phase of the phase shifter 331/332 is shifted by 360°, but in actual, an insertion loss value fluctuates by controlling the phase shift of the phase shifter 331/332, and as a result, it is difficult to achieve optimal interference removal.

Figure 5:
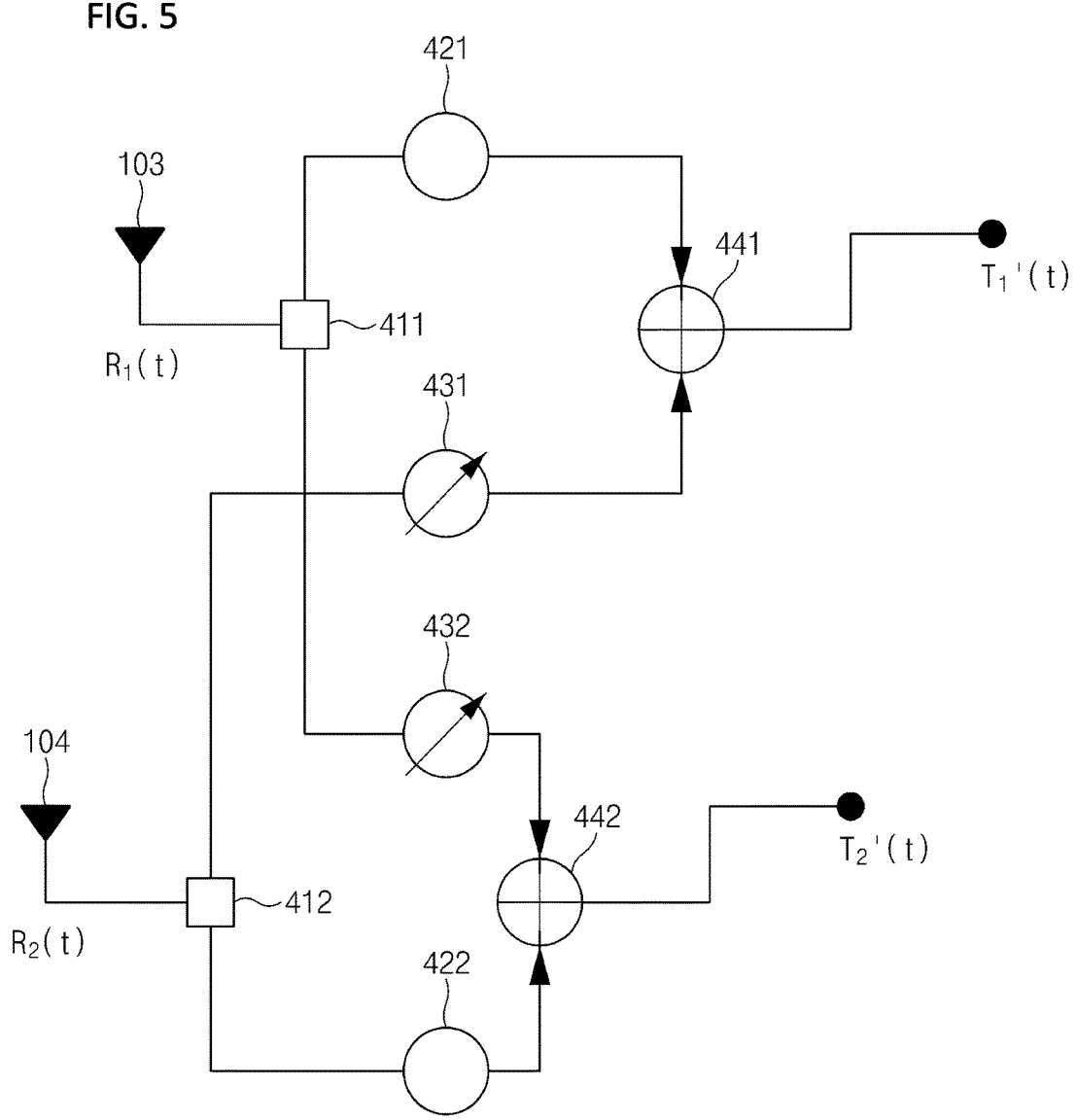
FIG. 5 is a configuration diagram of an interference removing module according to another exemplary embodiment of the present invention.

FIG. 5 is a configuration diagram of an interference removing module 400 according to another exemplary embodiment of the present invention. FIG. 5 is a diagram illustrating a configuration of a 2×2 line-of-sight multi-input multi-output interference removing module by using controllable variable attenuators 421 and 422 and phase shifters 431 and 432.

Referring to FIG. 5, the interference removing module 400 according to another exemplary embodiment of the present invention includes the power distributors 311 and 312, variable attenuators 421 and 422, phase shifters 431 and 432, and power couplers 441 and 442. Besides, the interference removing module 400 further includes a controller (not illustrated) for overall control of the components. A structure of FIG. 5 is a structure in which the fixed attenuators 321 and 322 are substituted with the variable attenuators 421 and 422 in FIG. 4.

Herein, in generating the reconstruction signals $T_1'(t)$ and $T_2'(t)$ from the received signals $R_1(t)$ and $R_2(t)$, the controller (not illustrated) appropriately controls signal magnitude attenuation changes of the variable attenuators 421 and 422 that compensate insertion loss of the phase shifters 431 and 432 on the direct path and phase shifts of the phase shifters 431 and 432 on the cross path to compensate even a magnitude error which occurs between a wireless channel and the receiver in addition to a phase, thereby minimizing the interference between both signals. However, the signals may have a narrowband frequency characteristic.

Figure 6:
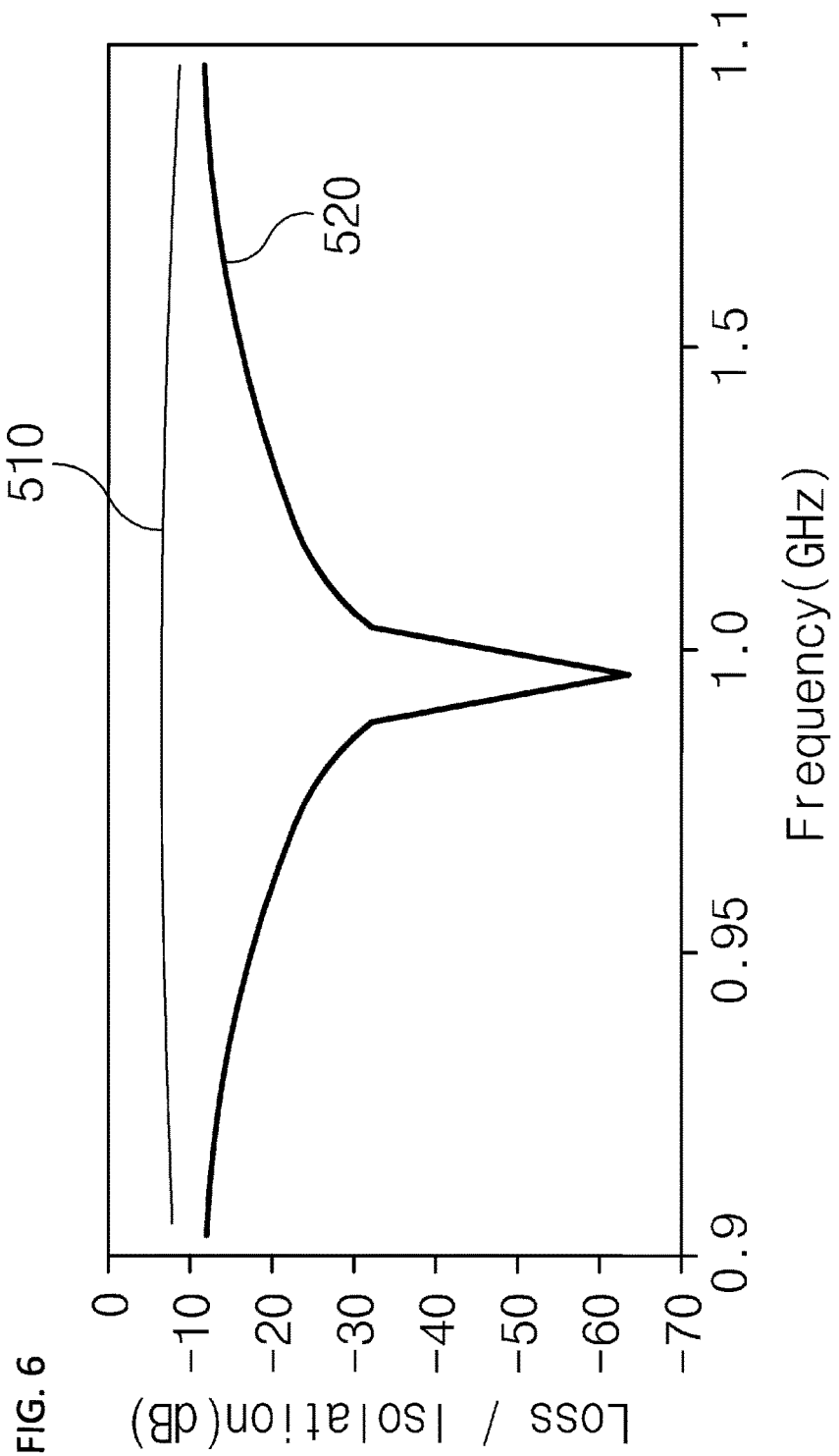
FIG. 6 is a graph regarding a measurement result of insertion loss and an interference removal value in the interference removing module of FIG. 5.

FIG. 6 is a graph regarding a measurement result of insertion loss and an interference removal value in the interference removing module 400 of FIG. 5.

As a result of measuring insertion loss 510 and an interference removal value 520 by manufacturing the interference removing module 400 of FIG. 5, as illustrated in FIG. 6 a very excellent interference removal value over 60 dB based on a center frequency of 1 GHz may be acquired, but it can be seen that the removal value rapidly decreases to the left/right side. This is a characteristic shown because phase shift characteristics depending on frequencies of a general attenuator and a general phase shifter used in the interference removing module are different from each other and only when characteristics of all signal transfer paths are similar to each other, excellent characteristics may be acquired in overall in a wide band.

Figure 7:
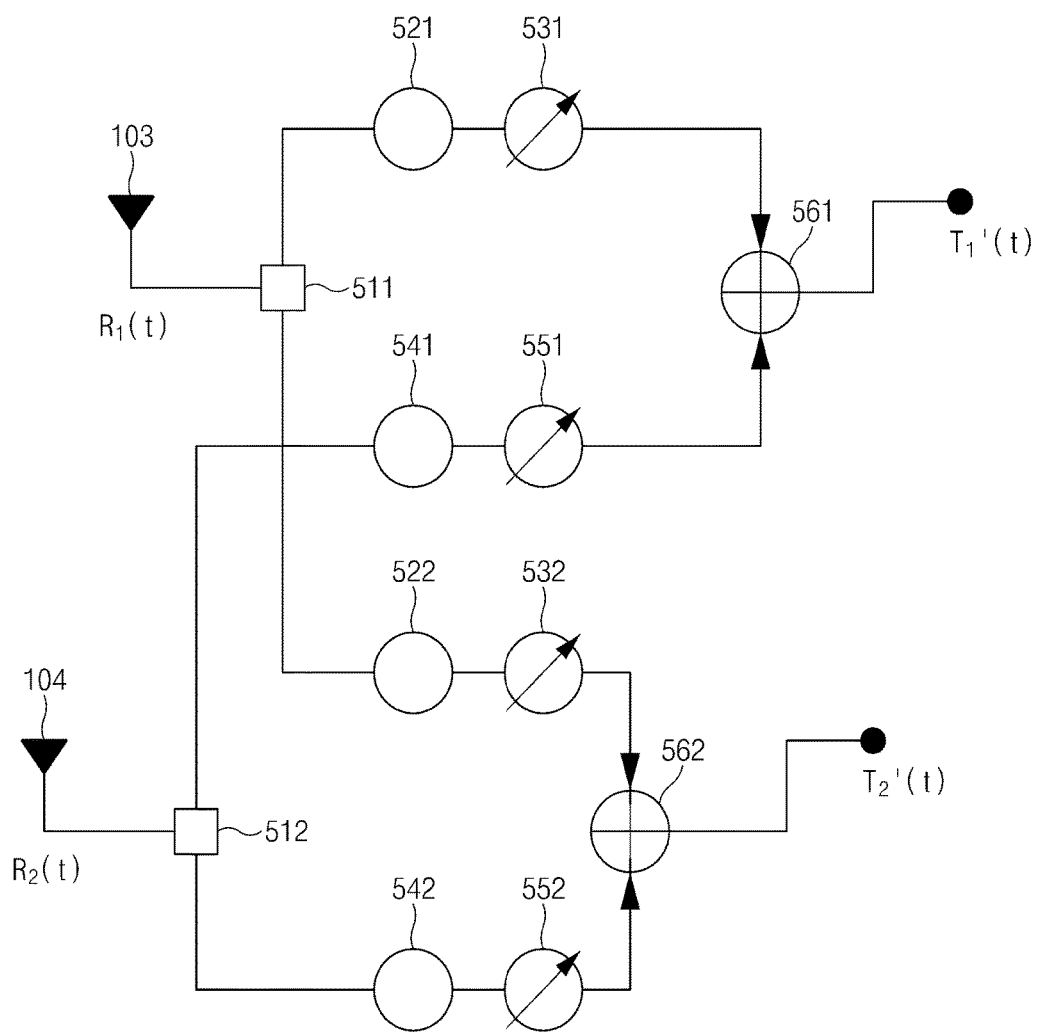
FIG. 7 is a configuration diagram of an interference removing module according to another exemplary embodiment of the present invention.

FIG. 7 is a configuration diagram of an interference removing module 500 according to yet another exemplary embodiment of the present invention. FIG. 7 is a diagram illustrating a configuration of a 2×2 line-of-sight multi-input multi-output interference removing module by using a variable attenuator and a phase shifter which are controllable on each of all 4 signal paths.

Referring to FIG. 7, the interference removing module 500 according to yet another exemplary embodiment of the present invention includes power distributors 511 and 512, power couplers 561 and 562, a variable attenuator 521 and a phase shifter 531 sequentially coupled between the power distributor 511 and the power coupler 561 on a first direct path, a variable attenuator 541 and a phase shifter 551 sequentially coupled between the power distributor 512 and the power coupler 561 on a first cross path, a variable attenuator 542 and a phase shifter 552 sequentially coupled between the power distributor 512 and the power coupler 562 on a second direct path, and a variable attenuator 522 and a phase shifter 532 sequentially coupled between the power distributor 511 and the power coupler 562 on a second cross path. Besides, the interference removing module 500 further includes a controller (not illustrated) for overall control of the components.

Figure 8:
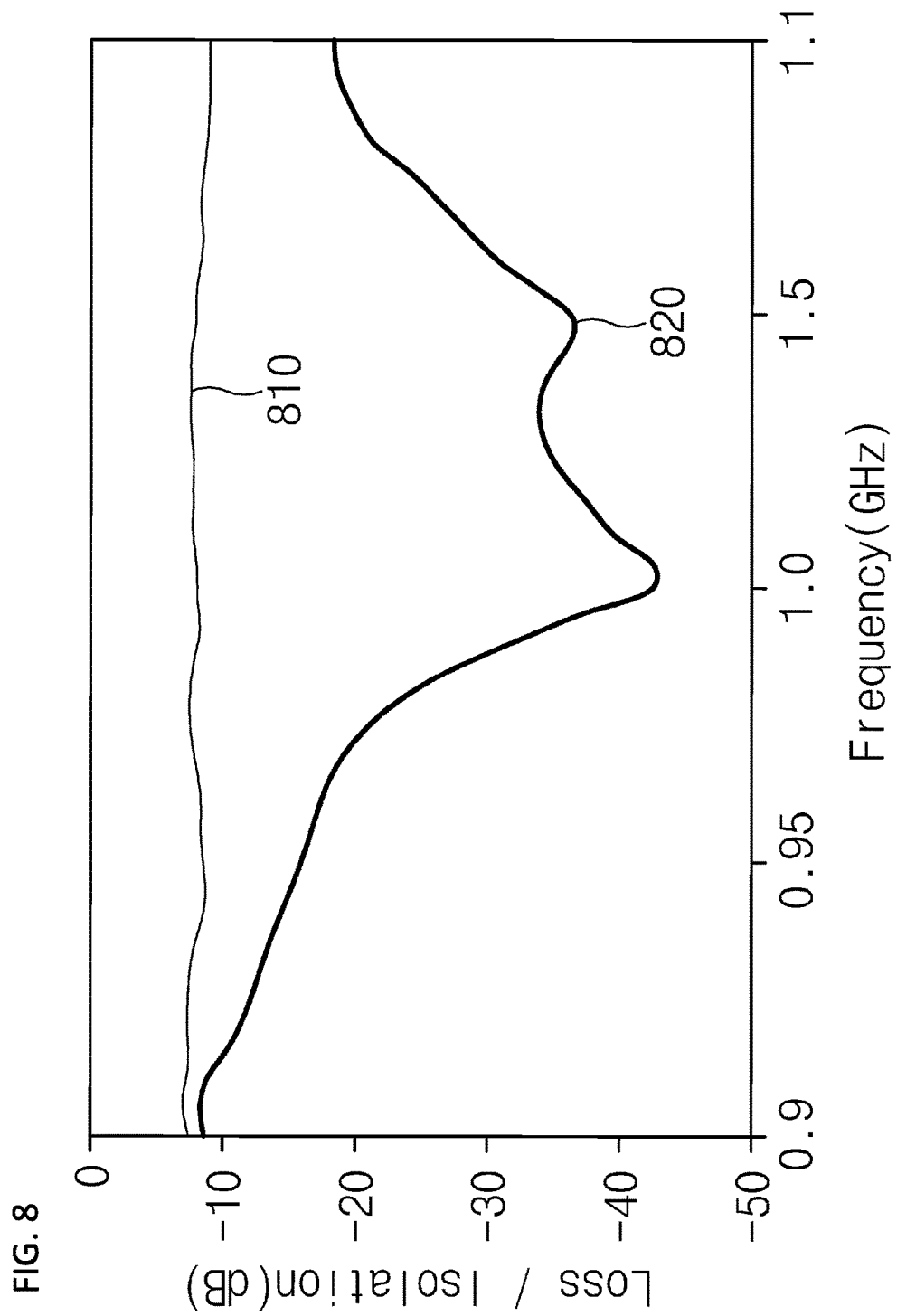
FIG. 8 is a graph regarding a measurement result of insertion loss and an interference removal value in the interference removing module of FIG. 7.

FIG. 8 is a graph regarding a measurement result of insertion loss and an interference removal value in the interference removing module 500 of FIG. 7.

Like the interference removing module 500 of FIG. 7, when the controllable variable attenuator and phase shifter are used on each of all 4 signal paths, a result value of measuring insertion loss 810 and an interference removal value 820 based on the interference removing module 500 which is actually manufactured is shown in FIG. 8. Herein, it can be seen that as compared with the case where the variable attenuator and the phase shifter are used separately in the path (the structure of FIG. 4/FIG. 5), an excellent characteristic is shown in a horizontally still wider band based on the center frequency of 1 GHz.

Figure 9:
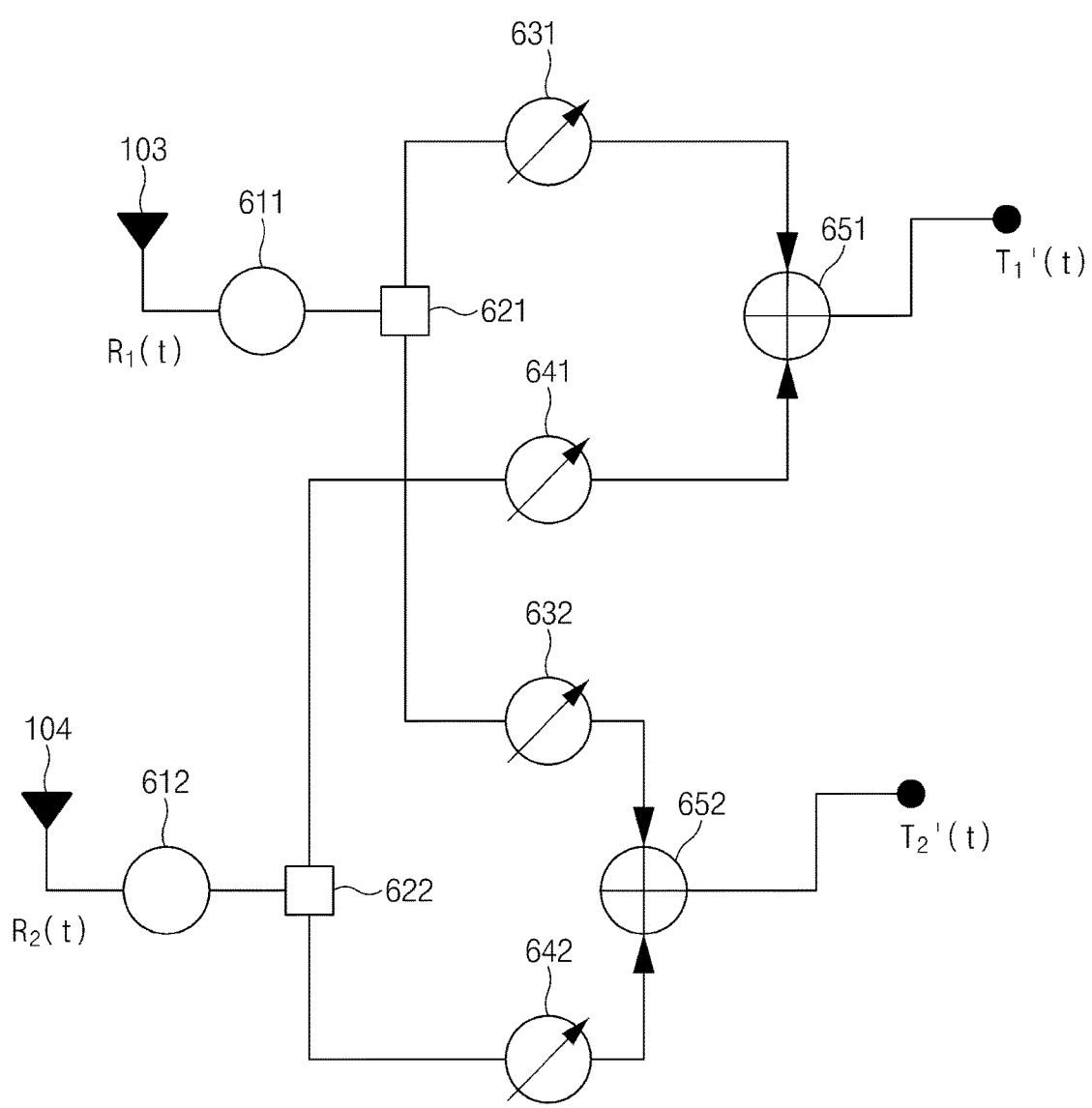
FIG. 9 is a configuration diagram of an interference removing module according to yet another exemplary embodiment of the present invention.

FIG. 9 is a configuration diagram of an interference removing module 600 according to yet another exemplary embodiment of the present invention. FIG. 9 is a diagram illustrating a configuration of the 2×2 line-of-sight multi-input multi-output interference removing module by using each of the variable attenuator and the phase shifter which are controllable on all 4 signal paths in order to similarly maintain a signal magnitude of each path and illustrates a structure in which the variable attenuator is just positioned on a common path at a front stage of the power distributor. Such a structure is a structure which may be used when an insertion loss shift amount depending on a phase shift of the phase shifter is not large and when it is assumed that a phase characteristic of the variable attenuator itself is excellent, the structure is a structure by which a widest bandwidth may be acquired.

Referring to FIG. 9, the interference removing module 600 according to yet another exemplary embodiment of the present invention includes variable attenuators 611 and 612, power distributors 621 and 622, power couplers 651 and 652, a phase shifter 631 coupled between the power distributor 621 and the power coupler 651 on the first direct path, a phase shifter 641 coupled between the power distributor 622 and the power coupler 651 on the first cross path, a phase shifter 642 coupled between the power distributor 622 and the power coupler 652 on the second direct path, and a phase shifter 632 coupled between the power distributor 621 and the power coupler 652 on the second cross path. Besides, the interference removing module 600 further includes a controller (not illustrated) for overall control of the components.

Figure 10:
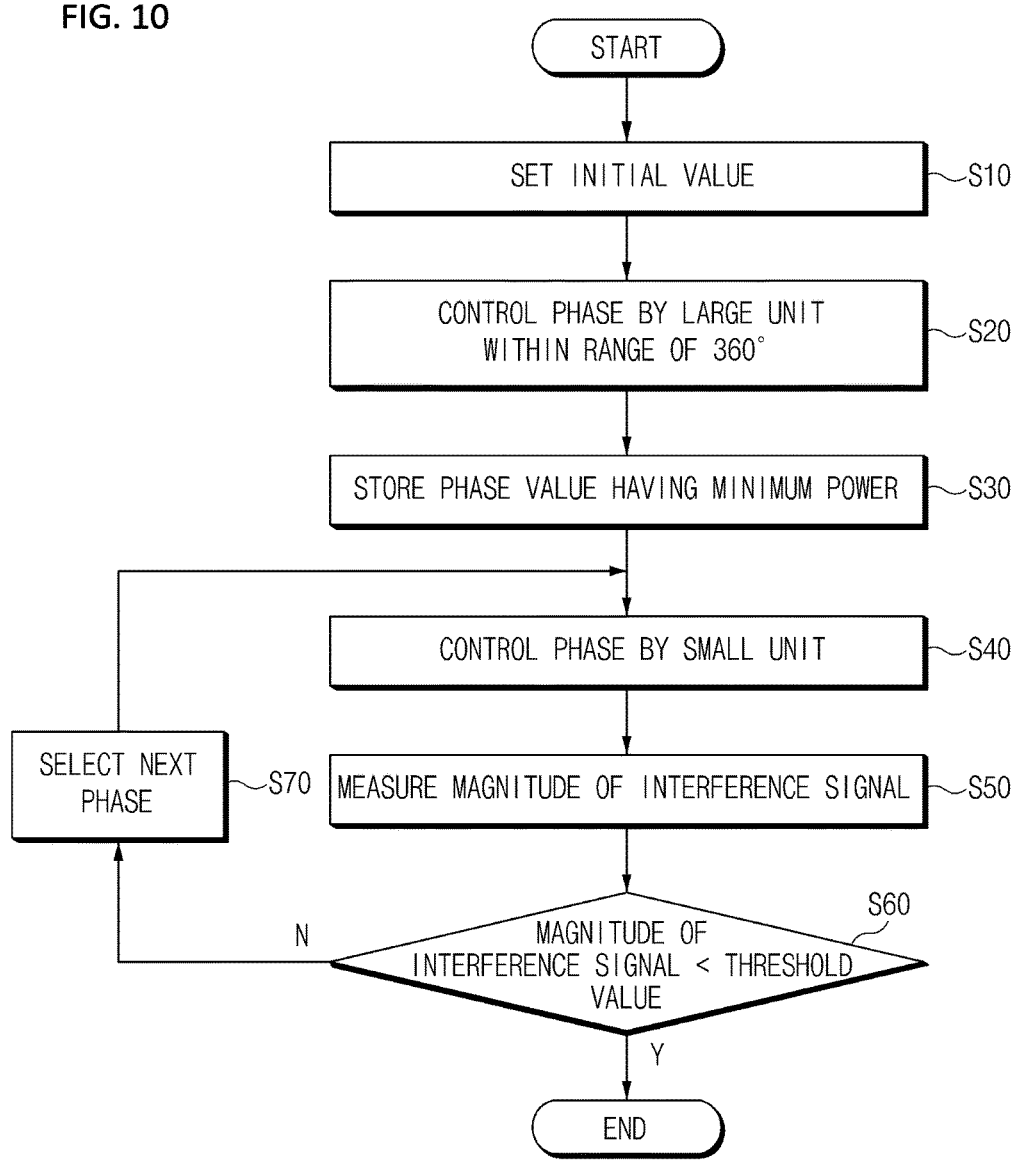
FIG. 10 is a flowchart of an analog type interference removing algorithm according to an exemplary embodiment of the present invention.

FIG. 10 is a flowchart of an analog type interference removing algorithm according to an exemplary embodiment of the present invention. in the structure of FIG. 4/FIG. 5/FIG. 7/FIG. 9, in generating the reconstruction signals $T_1'(t)$ and $T_2'(t)$ from the received signals $R_1(t)$ and $R_2(t)$, the interference removal may be analogously removed by implementing each of the respective components with an analog circuit and the controller (not illustrated) appropriately controls the signal magnitude attenuation change(s) of the variable attenuator(s) and the phase shift(s) of the phase shifter(s) to minimize interference of the 2×2 line-of-sight multi-input multi-output system 100 for point-to-point communication between the transmitter and the receiver and increase the frequency efficiency.

Referring to FIG. 10, first, the controller sets control initial value(s) of the variable attenuator(s)/phase shifter(s) (S10).

Next, the controller measures power for an output $T_1'(t)$/$T_2'(t)$ of the power coupler to store a phase value at minimum power (S30) while controlling the phase shift(s) of the phase shifter(s) with a comparatively large unit (e.g., the unit of 10°) in the range of 360° (S20). When the variable attenuator(s) is(are) applied, by a similar method, the controller stores signal attenuation values of the variable attenuators with minimum power by measuring the power for the output $T_1'(t)/T_2'(t)$ of the power coupler while controlling the signal magnitude changes (signal attenuation) of the variable attenuator(s) with a comparatively large unit in a predetermined signal magnitude range.

Next, the controller measures magnitudes of interference signals for signals of two paths input into the power coupler whenever changing each phase (S50) while controlling the phase shifts of the phase shifter(s) by selecting the phase shift amount while increasing or decreasing the phase shift amount with a comparatively small unit (e.g., the unit of 2°) within a vertical predetermined range (e.g., 30°) from the phase value (S20). When the interference signal is larger than a threshold value, a final phase shift amount is set by controlling a process of phase shift control of the phase shifter, magnitude measurement of the interference signal, and comparison with the threshold value to be repeated by selecting a next phase shift amount (S60 and S70). When the variable attenuator(s) is(are) applied, by the similar method, the controller may measure the magnitude of the interference signal and set a final signal attenuation value repeatedly until the interference signal is smaller than the threshold value while controlling the signal magnitude change(s) (signal attenuation) of the variable attenuator(s) by selecting the signal attenuation value while increasing or decreasing the signal attenuation value with the comparatively small unit within the vertical predetermined range from the signal attenuation value.

According to a measurement result, an interference removal value of 30 to 40 dB may be acquired by using the analog type interference removing module 500 having the structure of FIG. 7, but this is somewhat short for high-degree modulation/demodulation. Therefore, in order to solve the problem, an interference removing algorithm to additionally remove the interference signal which remains through digital signal processing is used as illustrated in FIG. 11.

Figure 11:
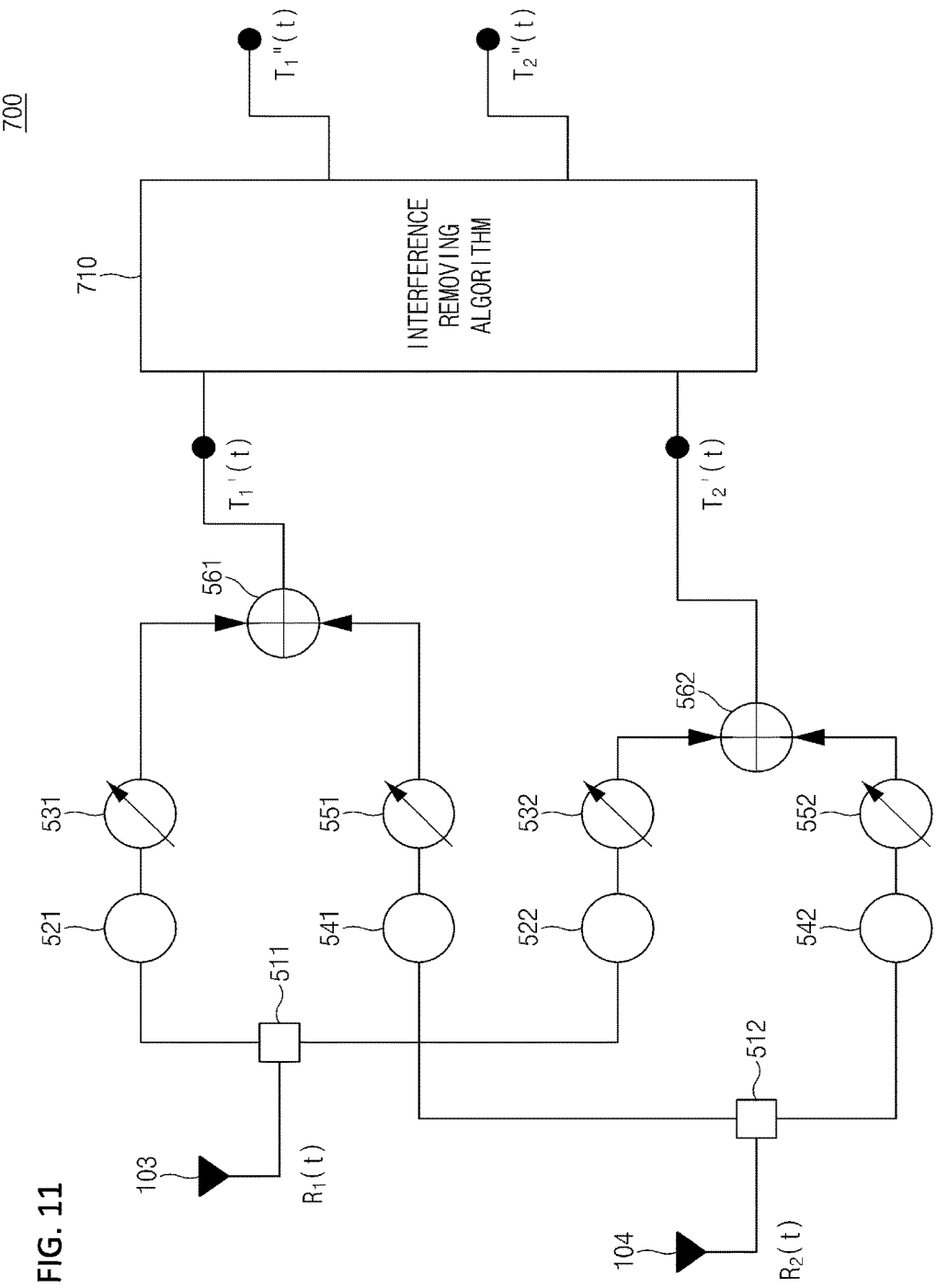
FIG. 11 is a configuration diagram of an interference removing module using an interference removing algorithm according to an exemplary embodiment of the present invention.

FIG. 11 is a configuration diagram of an interference removing module 700 using an interference removing algorithm according to an exemplary embodiment of the present invention. FIG. 11 illustrates a structure in which an interference removing unit 710 is added to the rear sides of the power couplers 561 and 562 in the structure of FIG. 7. The interference removing unit 710 may be added to the rear sides of the power couplers even in the structure of FIG. 4/FIG. 5/FIG. 9.

The interference removing unit 710 performs the digital type interference removing algorithm with respect to the outputs $T_1'(t)$ and $T_2'(t)$ of the power couplers 561 and 562 to output the reconstruction signals $T_1''(t)$ and $T_2''(t)$ from which the interference signal is additionally removed. The interference removing unit 710 is implemented by the digital circuit to remove the interference by the digital type.

Through the analog type interference removing module of FIG. 4/FIG. 5/FIG. 7/FIG. 9, a signal-to-interference ratio (SIR) is removed to some degree, but the interference removing unit 710 additionally removes the interference with respect to the outputs $T_1'(t)$ and $T_2'(t)$ of the power couplers 561 and 562.

For example, when it is assumed that $T_1'(t)$ of channel 1 is a signal having an SIR of 20 dB through the interference removing module with respect to an original transmission signal $T_1(t)$, it may be regarded that a $T_1(t)$ interference signal which is smaller than an original transmission signal $T_2(t)$ by 20 dB is present in a $T_2'(t)$ signal of channel 2 based on the assumption. Since the $T_1(t)$ interference signal which is present in the $T_2'(t)$ signal is similar to the $T_1'(t)$ signal of channel 1, the interference removing unit 710 extracts and removes the $T_1(t)$ interference signal from the $T_2'(t)$ signal of channel 2 through the digital method by using the $T_1'(t)$ signal of channel 1 to generate $T_2''(t)$. $T_2''(t)$ removed with the $T_1(t)$ interference signal as described above has a higher SIR than the $T_2'(t)$ signal.

Similarly, the interference removing unit 710 extracts and removes a $T_2(t)$ interference signal from the $T_1'(t)$ signal of channel 1 through the digital type by using the $T_2'(t)$ signal of channel 2 to generate. $T_1''(t)$ removed with the $T_2(t)$ interference signal as described above has a higher SIR than the $T_1'(t)$ signal.

According to the exemplary embodiment of the present invention, in a 2×2 multi-input multi-output system 100, provided is a multi-input multi-output system which analogously and automatically controls a variable attenuator(s) and a phase shifter(s) of an interference removing module of a receiver to maximize a signal-to-interference ratio of each path and maintain an optimal receiving performance and increase frequency efficiency according to an installation environment and a change in performance of the receiver to continuously maintain optimal performance. Further, further enhanced performance can be provided by using both an analog interference removing method and a digital interference removing method. In addition, since an interference removing module proposed in the present invention is inserted into a part of the receiver to simply operate in the conventional single-link transmission system, compatibility with the conventional system can be increased.

The above description just illustrates the technical spirit of the present invention and various modifications and transformations can be made to those skilled in the art without departing from an essential characteristic of the present invention.

Therefore, the exemplary embodiments disclosed in the present invention are used to not limit but describe the technical spirit of the present invention and the scope of the technical spirit of the present invention is not limited by the embodiments. The scope of the present invention should be interpreted by the appended claims and it should be analyzed that all technical spirits in the equivalent range are intended to be embraced by the present invention.

What is claimed is:

1. An interference removing module of a receiver in a multi-input multi-output system for point-to-point communication between a transmitter and a receiver on a line-of-sight, the interference removing module comprising:
   an attenuator on a direct path for processing a first received signal of the first received signal and a second received signal received through two receiving antennas;
   a phase shifter on a cross path for processing the second received signal of the first received signal and the second received signal received through the two receiving antennas;
   a coupler generating a reconstruction signal for a transmission signal transmitted from the transmitter by synthesizing an output of the attenuator and an output of the phase shifter; and
   a controller performing overall control,
   wherein according to control of the controller, interference signals on the direct path and the cross path are removed to generate the reconstruction signal removed with the interference signal in the coupler.

2. The interference removing module of claim 1, wherein the interference removing module is implemented by an analog circuit to remove the interference signal through an analog method.

3. The interference removing module of claim 1, wherein the interference removing module is coupled between a radio frequency (RF) unit and an intermediate frequency (IF) unit or between the two receiving antennas and the RF unit.

4. The interference removing module of claim 1, wherein:
the phase shifter controls a phase of the second received signal on the cross path according to the control of the controller, and
the attenuator as a fixed attenuator compensates an insertion loss of the phase shifter on the direct path.

5. The interference removing module of claim 1, wherein the phase shifter controls the phase of the second received signal on the cross path according to the control of the controller, and
the attenuator as a variable attenuator controls attenuation of a magnitude of the first received signal and compensates the insertion loss of the phase shifter on the direct path according to the control of the controller.

6. The interference removing module of claim 1, further comprising:
a second variable attenuator and a second phase shifter in addition to the attenuator as a first variable attenuator and the phase shifter as a first phase shifter,
wherein the interference removing module includes a structure having the first variable attenuator and the first phase shifter sequentially coupled on the direct path in order to process the first received signal output from the first distributor between a first distributor connected to a first antenna between the two receiving antennas and the coupler, and
the second variable attenuator and the second phase shifter sequentially coupled on the cross path in order to process the second received signal output from the second distributor between a second distributor connected to a second antenna between the two receiving antennas and the coupler.

7. The interference removing module of claim 1, further comprising:
a second variable attenuator and a second phase shifter in addition to the attenuator as the first variable attenuator and the phase shifter as the first phase shifter,
wherein the interference removing module includes a structure having the first variable attenuator connected to the first antenna between the two receiving antennas,
the first phase shifter on the direct path, which processes the first received signal output from the first distributor between the first distributor connected to an output of the first variable attenuator and the coupler,
the second variable attenuator connected to the second antenna between the two receiving antennas, and
the second phase shifter on the cross path, which processes the second received signal output from the second distributor between the second distributor connected to an output of the second variable attenuator and the coupler.

8. The interference removing module of claim 1, wherein the controller controls the phase shift by a small unit with respect to the phase shifter when an output of the coupler is minimum power by controlling the phase shift by a large unit with respect to the phase shifter to control the reconstruction signal when the interference signal is smaller than a threshold value to be generated.

9. The interference removing module of claim 1, wherein the controller controls a signal magnitude change by the small unit with respect to the attenuator when the output of the coupler is the minimum power by controlling the signal magnitude change by the large unit with respect to the attenuator as the variable attenuator to control the reconstruction signal when the interference signal is smaller than the threshold value to be generated.

10. The interference removing module of claim 1, further comprising:
a second attenuator on a second direct path for processing the second received signal;
a second phase shifter on a second cross path for processing the first received signal;
a second coupler generating a second reconstruction signal for the second transmitted signal transmitted by the transmitter by synthesizing an output of the second attenuator and an output of the second phase shifter; and
an interference removing unit further performing digital type interference removal with respect to the reconstruction signal and the second reconstruction signal,
wherein the interference removing unit extracts and removes the interference signal of the transmitted signal transmitted by the transmitter from the second reconstruction signal by using the reconstruction signal and extracts and removes the interference signal of the second transmitted signal transmitted by the transmitter from the reconstruction signal by using the second reconstruction signal to output signals in which a signal-to-interference ratio (SIR) is enhanced.

11. An interference removing method of a receiver in a multi-input multi-output system for point-to-point communication between a transmitter and a receiver on a line-of-sight, the interference removing method comprising:
processing, by an attenuator on a direct path, a first received signal of the first received signal and a second received signal received through two receiving antennas;
processing, by a phase shifter on a cross path, the second received signal of the first received signal and the second received signal received through the two receiving antennas; and
generating, by a coupler, a reconstruction signal for a transmission signal transmitted from the transmitter by synthesizing an output of the attenuator and an output of the phase shifter,
wherein in the interference removing method, interference signals on the direct path and the cross path are removed to generate the reconstruction signal removed with the interference signal through the coupler.

12. The interference removing method of claim 11, wherein the interference removing method is performed between a radio frequency (RF) unit and an intermediate frequency (IF) unit or between the two receiving antennas and the RF unit.

13. The interference removing method of claim 11, wherein the phase shifter controls a phase of the second received signal on the cross path according to a control of a controller and the attenuator as a fixed attenuator compensates an insertion loss of the phase shifter on the direct path.

14. The interference removing method of claim 11, wherein the phase shifter controls the phase of the second received signal on the cross path according to the control of the controller and the attenuator as a variable attenuator controls attenuation of a magnitude of the first received signal on the direct path according to the control of the controller and compensates the insertion loss of the phase shifter.

15. The interference removing method of claim 11, further comprising:
wherein a second variable attenuator and a second phase shifter are further used in addition to the attenuator as the first variable attenuator and the phase shifter as the first phase shifter,
processing the first received signal output from the first distributor between a first distributor connected to a first antenna of the two received antennas and the coupler by using the first variable attenuator and the first phase shifter sequentially coupled on the direct path; and
processing the second received signal output from the second distributor between a second distributor connected to a second antenna of the two received antennas and the coupler by using the second variable attenuator and the second phase shifter sequentially coupled on the cross path.

16. The interference removing method of claim 11, further comprising:
wherein the second variable attenuator and the second phase shifter are further used in addition to the attenuator as the first variable attenuator and the phase shifter as the first phase shifter,
processing the first received signal output from the first distributor between the first distributor connected to an output of the first variable attenuator connected to the first antenna of the two received antennas and the coupler by using the first phase shifter on the direct path; and
processing the second received signal output from the second distributor between the second distributor connected to an output of the second variable attenuator connected to the second antenna of the two received antennas and the coupler by using the second phase shifter on the cross path.

17. The interference removing method of claim 11, wherein the controller controls the phase shift by a small unit with respect to the phase shifter when an output of the coupler is minimum power by controlling the phase shift by a large unit with respect to the phase shifter to control the reconstruction signal when the interference signal is smaller than a threshold value to be generated.

18. The interference removing method of claim 11, wherein the controller controls a signal magnitude change by the small unit with respect to the attenuator when the output of the coupler is the minimum power by controlling the signal magnitude change by the large unit with respect to the attenuator as the variable attenuator to control the reconstruction signal when the interference signal is smaller than the threshold value to be generated.

19. The interference removing method of claim 11, further comprising:
wherein a second attenuator on a second direct path for processing the second received signal, a second phase shifter on a second cross path for processing the first received signal, a second coupler generating a second reconstruction signal for the second transmitted signal transmitted by the transmitter by synthesizing an output of the second attenuator and an output of the second phase shifter, and an interference removing unit further performing digital type interference removal with respect to the reconstruction signal and the second reconstruction signal are further used,
extracting and removing, by the interference removing unit, the interference signal of the transmitted signal transmitted by the transmitter from the second reconstruction signal by using the reconstruction signal and extracting and removing the interference signal of the second transmitted signal transmitted by the transmitter from the reconstruction signal by using the second reconstruction signal to output signals in which a signal-to-interference ratio (SIR) is enhanced.

* * * * *